United States Patent
Luo (10) Patent No.: US 11,389,961 B2
(45) Date of Patent: Jul. 19, 2022

(54) ARTICLE SEARCHING METHOD AND ROBOT THEREOF

(71) Applicant: CLOUDMINDS (SHENZHEN) ROBOTICS SYSTEMS CO., LTD., Shenzhen (CN)

(72) Inventor: Lei Luo, Shenzhen (CN)

(73) Assignee: CLOUDMINDS (SHENZHEN) ROBOTICS SYSTEMS CO., LTD., Shenzhen (CN)

( * ) Notice: Subject to any disclaimer, the term of this patent is extended or adjusted under 35 U.S.C. 154(b) by 286 days.

(21) Appl. No.: 16/679,692

(22) Filed: Nov. 11, 2019

(65) Prior Publication Data
US 2020/0070348 A1 Mar. 5, 2020

Related U.S. Application Data

(63) Continuation of application No. PCT/CN2017/083965, filed on May 11, 2017.

(51) Int. Cl.
*B25J 9/16* (2006.01)
*B25J 9/00* (2006.01)
*G06K 9/00* (2022.01)
*G06V 20/20* (2022.01)
*G06V 20/64* (2022.01)

(52) U.S. Cl.
CPC .......... *B25J 9/1679* (2013.01); *B25J 9/0003* (2013.01); *G06V 20/20* (2022.01); *G06V 20/647* (2022.01)

(58) Field of Classification Search
CPC ...... B25J 9/1679; B25J 9/0003; B25J 9/1694; B25J 9/16; G06V 20/20; G06V 20/647; G05B 2219/40577; G05B 2219/40594; G06F 16/951

USPC .................................. 700/245, 248, 257, 259
See application file for complete search history.

(56) References Cited

U.S. PATENT DOCUMENTS

| | | | |
|---|---|---|---|
| 8,386,079 B1 * | 2/2013 | Kohler ................... | G06N 3/008 700/246 |
| 8,984,136 B1 * | 3/2015 | Francis, Jr. ......... | G06F 16/2468 709/226 |
| 9,827,677 B1 * | 11/2017 | Gilbertson ........... | B25J 15/0014 |
| 9,827,678 B1 * | 11/2017 | Gilbertson ............. | B25J 18/025 |

(Continued)

FOREIGN PATENT DOCUMENTS

| CN | 102982170 A | 3/2013 |
|---|---|---|
| CN | 105573326 A | 5/2016 |

(Continued)

OTHER PUBLICATIONS

CN106874092.Abstract.English.translate.Robot Task Hosting Method And System, Shenzhen Benben Robot Co Ltd (Year: 2017).*

(Continued)

*Primary Examiner* — B M M Hannan (57) ABSTRACT

An article searching method includes: receiving a search task for searching for an article to be searched; acquiring, based on the search task, a three dimensional model corresponding to the article to be searched; determining a search task group for searching for the article to be searched; and searching for the article to be searched based on the acquired three dimensional model and in combination with the search task group, wherein the search task group shares a search result in the process of searching for the article to be searched.

18 Claims, 7 Drawing Sheets

(56) References Cited

U.S. PATENT DOCUMENTS

| | | | | |
|---|---|---|---|---|
| 10,365,404 | B2* | 7/2019 | Collins | G01S 7/003 |
| 2013/0238121 | A1* | 9/2013 | Davey | G06F 30/13 |
| | | | | 700/245 |
| 2014/0095119 | A1* | 4/2014 | Lee | G06F 30/13 |
| | | | | 703/1 |
| 2014/0219502 | A1* | 8/2014 | Hirota | G01B 11/002 |
| | | | | 382/103 |
| 2014/0279733 | A1* | 9/2014 | Djugash | B25J 19/023 |
| | | | | 706/12 |
| 2015/0142716 | A1* | 5/2015 | Lucey | G06N 5/022 |
| | | | | 706/46 |
| 2015/0274421 | A1* | 10/2015 | Yamada | B25J 11/008 |
| | | | | 700/218 |
| 2015/0314442 | A1* | 11/2015 | Boca | B25J 9/1656 |
| | | | | 700/253 |
| 2017/0046965 | A1* | 2/2017 | Kamhi | G06K 9/00671 |
| 2017/0061632 | A1* | 3/2017 | Lindner | G01S 7/4972 |
| 2018/0079081 | A1* | 3/2018 | Chen | G06Q 10/087 |
| 2018/0165518 | A1* | 6/2018 | Assaf | G06K 9/00671 |
| 2018/0218538 | A1* | 8/2018 | Short | G02B 27/017 |
| 2021/0399943 | A1* | 12/2021 | Luo | H04L 41/0889 |

FOREIGN PATENT DOCUMENTS

| | | | | |
|---|---|---|---|---|
| CN | 106314728 | A | | 1/2017 |
| CN | 205969038 | U | | 2/2017 |
| CN | 106874092 | A * | 6/2017 | ............ B25J 11/003 |
| JP | 2005262378 | A | | 9/2005 |
| JP | 2016514865 | A | | 5/2016 |

OTHER PUBLICATIONS

CN 106874092.English.translate.Robot Task Hosting Method And System, Shenzhen Benben Robot Co Ltd (Year: 2017).*

International Search Report dated Feb. 9, 2018; PCT/CN2017/083965.

1st Office Action dated Dec. 8, 2020 by the JP Office; Appln.No. 2019-561904.

* cited by examiner

FIG. 12 ps://ctrl# US 11,389,961 B2

ARTICLE SEARCHING METHOD AND ROBOT THEREOF

CROSS-REFERENCE TO RELATED APPLICATIONS

This application is a continuation of International Application No. PCT/CN2017/083965 with an international filing date of May 11, 2017, the entire contents of which are incorporated herein by reference.

TECHNICAL FIELD

The present application relates to the technical field of Internet of things, and in particular, relates to an article searching method and apparatus, and a robot thereof.

BACKGROUND

Due to factors such as neglect or poor memory, people may fail to find their desired articles at home or some fixed places, for example, books, glasses, keys or the like.

In the future, robots may be used in households, for example, house keeping robots, cleaning robots, article reorganizing robots, nursing robots or the like. If the robots may help the users to find the articles, efficiency of finding the articles by the users may be greatly improved.

SUMMARY

An embodiment of the present application provides an article searching method. The method includes: receiving a search task for searching for an article to be searched; acquiring, based on the search task, a 3D (three-dimensional, hereafter 3D) model corresponding to the article to be searched; determining a search task group for searching for the article to be searched; and searching for the article to be searched based on the acquired 3D model and in combination with the search task group, wherein the search task group shares a search result in the process of searching for the article to be searched.

Another embodiment of the present application provides a robot. The robot includes at least one processor; and a memory communicably connected to the at least one processor; wherein the memory stores an instruction program executable by the at least one processor, wherein, the instruction program, when being executed by the at least one processor, cause the at least one processor to perform the steps of: receiving a search task for searching for an article to be searched; acquiring, based on the search task, a 3D model corresponding to the article to be searched; determining a search task group for searching for the article to be searched; and searching for the article to be searched based on the acquired 3D model and in combination with the search task group, wherein the search task group shares a search result in the process of searching for the article to be searched.

Still another embodiment of the present application provides a non-volatile computer-readable storage medium. The computer-readable storage medium stores computer-executable instructions, which, when being executed by a computer, cause the computer to perform the steps of: receiving a search task for searching for an article to be searched; acquiring, based on the search task, a 3D model corresponding to the article to be searched; determining a search task group for searching for the article to be searched; and searching for the article to be searched based on the acquired 3D model and in combination with the search task group, wherein the search task group shares a search result in the process of searching for the article to be searched.

BRIEF DESCRIPTION OF THE DRAWINGS

One or more embodiments are illustrated by way of example, and not by limitation, in the figures of the accompanying drawings, wherein components having the same reference numeral designations represent like components throughout. The drawings are not to scale, unless otherwise disclosed.

DETAILED DESCRIPTION

For clearer descriptions of the objectives, technical solutions, and advantages of the present application, the present application is further described with reference to specific embodiments and attached drawings. It should be understood that the specific embodiments described herein are only intended to explain the present application instead of limiting the present application.

Figure 1:
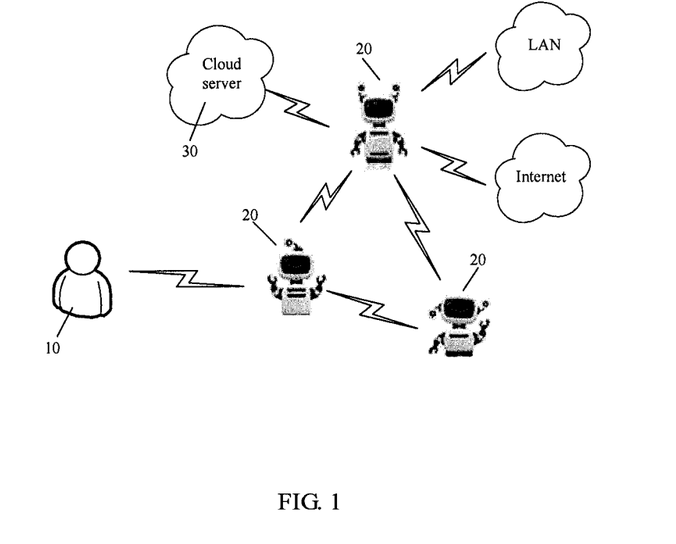
FIG. 1 is a schematic diagram of an application environment of an article searching method according to an embodiment of the present application.

Referring to FIG. 1, FIG. 1 is a schematic diagram of an application environment of an article searching method according to an embodiment of the present application. As illustrated in FIG. 1, the application environment involves a user 10, a smart terminal 20 and a cloud server 30.

The user 10 may be a group having the same or similar operation behaviors in any quantity, for example, a family, a work group or individuals. The user 10 may perform data interaction with the smart terminal 20 by voice, text, body action or the like.

The smart terminal 20 may be any suitable type of electronic device having specific logic operation capabilities, and providing one or more functions that accommodate intensions of the user. For example, the smart terminal may be a cleaning robot, an article reorganizing robot, a nursing robot or the like. The smart terminal 20 has the functions of visual search, voice acquisition, and voice recognition, image acquisition and image recognition, and the like. Upon receiving voices, texts, body actions or the like input by the user 10, the smart terminal 20 may acquire a task issued by the user 10 by the voice recognition or image recognition or the like function. The smart terminal 20 may access a local area network or the Internet, and upon receiving a task, the smart terminal 20 may assist to complete the task by accessing the local area network or the Internet. In this course, the smart terminal 20 may exchange data with the cloud server 30, and powerful computation capabilities of the cloud server 30 help the smart terminal 20 to complete the task issued by the user 10.

The task issued by the user 10 may be performed by one or a plurality of smart terminals 20. When the task issued by the user 10 is performed by a plurality of smart terminals 20, the plurality of smart terminals 20 may communicate with each other, and share data information. Further, instead of only one smart terminal as illustrated in FIG. 1, the plurality of smart terminals 20 may all access the local area network, the Internet and the cloud server.

The cloud server 30 is configured to provide cloud services for the smart terminals 20, which are specific directed to cloud computation and cloud storage demands. Upon receiving a cloud computation request initiated by the smart terminal 20, the cloud server acquires an application or calls a stored application to perform cloud computation, for example, performing 3D modeling for an article. Upon receiving a cloud storage request initiated by the smart terminal 20, the cloud server 30 may cache the data information. The cloud server 30 may store data information to be pre-stored.

It should be noted that the article searching method according to the embodiment of the present application may be further applied to other suitable application environments, which is not limited to the application environment as illustrated in FIG. 1. Although FIG. 1 only illustrates one user 10, three smart terminals 20 and one cloud server 30, a person skill in the art may understand that in practice, the application environment may involve more or fewer users, smart terminals and cloud servers.

Hereinafter, the embodiments of the present application are further illustrated with reference to the accompanying drawings.

Figure 2:
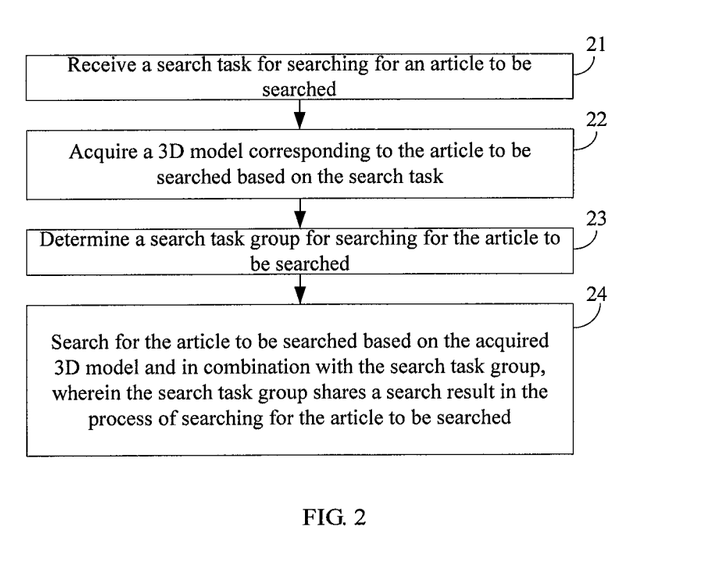
FIG. 2 is a schematic flowchart of an article searching method according to an embodiment of the present application.

Referring to FIG. 2, FIG. 2 is a schematic flowchart of an article searching method according to an embodiment of the present application. As illustrated in FIG. 2, the method includes the following steps:

Step 21: A search task for searching for an article to be searched is received.

In this embodiment, the smart terminal receives a search task issued by a user, wherein the search task is intended to search for an article in a space. The user may issue a search task to the smart terminal by voice input or text input or gesture input or the like, wherein the search task includes key information of an article to be searched, and the smart terminal may understand the search task based on the key information. When the user inputs a search task by voice or text, the smart terminal may understand a keyword of the search task based on voice recognition and semantic understanding. When the user inputs a search task by body action such as a gesture, the smart terminal may extract a keyword of the search task based on action recognition or the like.

For example, the user may call one or several robots in a family, for example, "Tom, please help me find my book, The Making of a Hero"; and upon receiving a voice message sent by the user, a robot named Tom identifies key information "book" and "The Making of a Hero" by voice recognition and semantic understanding. In this way, the current search task is to find a book named The Making of a Hero.

Step 22: A 3D model corresponding to the article to be searched is acquired based on the search task.

Upon receiving the search task, the smart terminal acquires a 3D model corresponding to the article to be searched based on the key information included in the search task, such that the article to be searched is searched for based on the 3D model in the subsequent search process.

Figure 3:
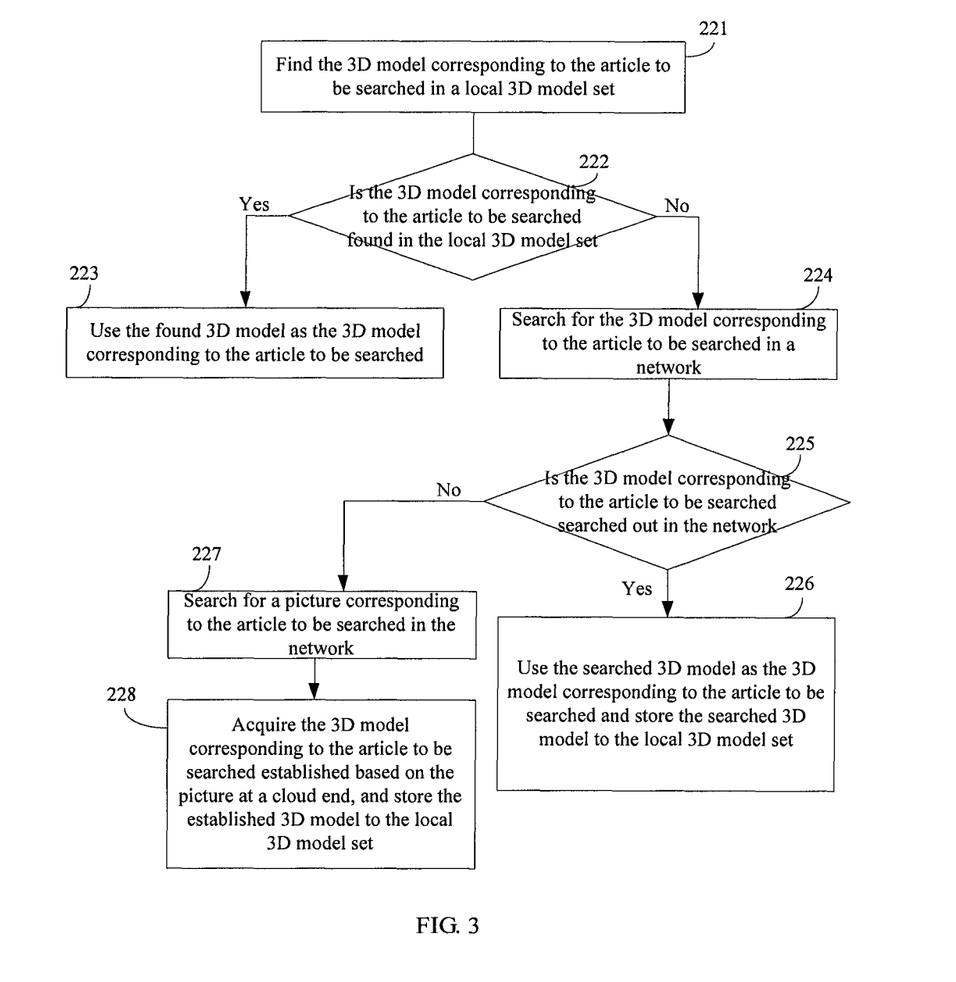
FIG. 3 is a schematic flowchart of acquiring a 3D model corresponding to an article to be searched in an article searching method according to an embodiment of the present application.

Specifically, as illustrated in FIG. 3, the acquiring a 3D model corresponding to the article to be searched includes the following sub-steps:

Sub-step 221: The 3D model corresponding to the article to be searched is found in a local 3D model set.

Sub-step 222: Whether the 3D model corresponding to the article to be searched is found in the local 3D model set is judged.

Sub-step 223: The found 3D model is used as the 3D model corresponding to the article to be searched if the 3D model corresponding to the article to be searched is found in the local 3D model set.

In this embodiment, the smart terminal finds the 3D model of the article to be searched in the local 3D model by accessing a local area network. Herein, the keyword included in the search task may be matched with a textual label corresponding to each 3D model in the local model set. If the keyword is consistent with the textual label, it is determined that the 3D model is found. The textual label corresponding to each 3D model is intended to interpret or illustrate the 3D model stored in the local 3D model set.

The local 3D model set is a pre-established data set that includes 3D models of articles in the current region. The articles in the current region may be all the articles in the current region, or may be some articles that are frequently used by the user, or may be some small-sized articles that are hard to be found, or the like. Further, the 3D models in the local 3D model set may be established based on the categories of the articles. For example, the category "book" corresponds to one or several types of 3D models, and the category "mobile phone" corresponds to one or several types of 3D models.

All the contents in the local 3D model set may be stored on a local server, or may be stored on the smart terminal, or may be stored in a cloud server, which is not limited herein. In addition, according to the specific application scenarios, the contents in the local 3D model set may be updated.

If the 3D model corresponding to the article to be searched is not found in the local 3D model set, further, still referring to FIG. 3, the method for acquiring the 3D model corresponding to the article to be searched further includes the following sub-steps:

Sub-step 224: The 3D model corresponding to the article to be searched is searched for in a network if the 3D model corresponding to the article to be searched is not found in the local 3D model set.

Sub-step 225: Whether the 3D model corresponding to the article to be searched is searched out in the network is judged.

Sub-step 226: The searched 3D model is used as the 3D model corresponding to the article to be searched and the searched 3D model is stored to the local 3D model set if the 3D model corresponding to the article to be searched is searched out in the network.

In this embodiment, if the 3D model corresponding to the article to be searched is not searched out in the local 3D model set, the 3D model is searched for in the Internet. Herein, the 3D model corresponding to the keyword is searched for in the network based on the keyword included in the search task. It may be understood that the number of 3D models searched out is related to the keyword for searching, and the more detailed the keyword, the more accurate the 3D model searched out. However, when some articles have a plurality of versions or styles, and the specific 3D models may not be differentiated by the keywords, the 3D model corresponding to the article to be searched may be determined based on interactions with the user.

For example, during searching for the 3D model of the book "The Making of a Hero" in the network, since the book may have different versions or different cover styles, a plurality of 3D models of the book may be obtained by searching for the 3D model corresponding to the book based on the name of the book. In this case, a picture of the book may be searched for based on the keyword, and the picture (that is, the cover style) of the book that is searched out may be presented to the user by screen or projection. The user may be prompted that this book may be in a plurality of versions by a voice prompt, and the user is expected to make a choice among the versions. Upon receiving the voice prompt, the user may make the choice by voice or tapping the screen. After a picture chosen by the user is received, the 3D model corresponding to the article to be searched is searched for based on the picture.

If the 3D model corresponding to the article to be searched is not searched out in the network, further, still referring to FIG. 3, the method for acquiring the 3D model corresponding to the article to be searched further includes the following sub-steps:

Sub-step 227: A picture corresponding to the article to be searched is searched for in the network if the 3D model corresponding to the article to be searched is not searched out in the network.

Sub-step 228: The 3D model corresponding to the article to be searched established is acquired based on the picture at a cloud end, and the established 3D model is stored to the local 3D model set.

In this embodiment, if the 3D model corresponding to the article to be searched is neither found in the local 3D model set nor in the network, the 3D model is established for the article to be searched. A large number of pictures related to the article to be searched are searched for in the network, and then the 3D model is established for the article based on these pictures. Practice of establishing the 3D model based on the pictures is described in detail in the related art, which is not described herein any further. The 3D model corresponding to the article may be established in the cloud server. The smart terminal sends the pictures searched out to the cloud server. The cloud server returns a modeling result to the smart terminal, and stores the established 3D model to the local 3D model set to enrich the contents in the local 3D model set. The 3D model may also be established in the smart terminal.

Step 23: A search task group for searching for the article to be searched is determined.

In this embodiment, the search task group is a smart terminal set including at least two smart terminals. The smart terminals in the set may all be employed to search the article. The search task group may be established in the following way.

For example, when a house keeping robot receives the task for searching for the article to be searched that is issued by the user, the house keeping robot may notify robots having a visual search function among all the local robots of the user, and thus places these selected robots into a search task group.

For example, when at least two robots of the local robots of the user receive the search task issued by the user, the robots receiving the same search task are placed into a search task group.

For example, the robots of the local robots of the user that are in an idle state are placed into a search task group. Further, a priority of the search task issued by the user is compared with priorities of tasks that are currently performed by the local robots. If the priorities of the tasks that are currently performed by the local robots are lower than the priority of the search task, the robots corresponding to the low priorities are placed into the search task group, such that these robots preferentially perform the search task, and the currently performed tasks may be cached.

Searching the article by establishing the search task group not only improves search efficiency, but also effectively enhances probability of finding the article.

Step 24: The article to be searched is searched for based on the acquired 3D model and in combination with the search task group, wherein the search task group shares a search result in the process of searching for the article to be searched.

In this embodiment, the smart terminal that acquires the 3D model sends the acquired 3D model to the other smart terminals in the search task group, such that the smart terminal searches the article to be searched based on the 3D model in combination with the search task group. In this course, the smart terminals in the search task group may communicate with each other, and share the search process and the search result.

In some embodiments, the smart terminal in the search task group is a robot, and the search task group established by the robot may search for the article to be searched in the following way.

Figure 4:
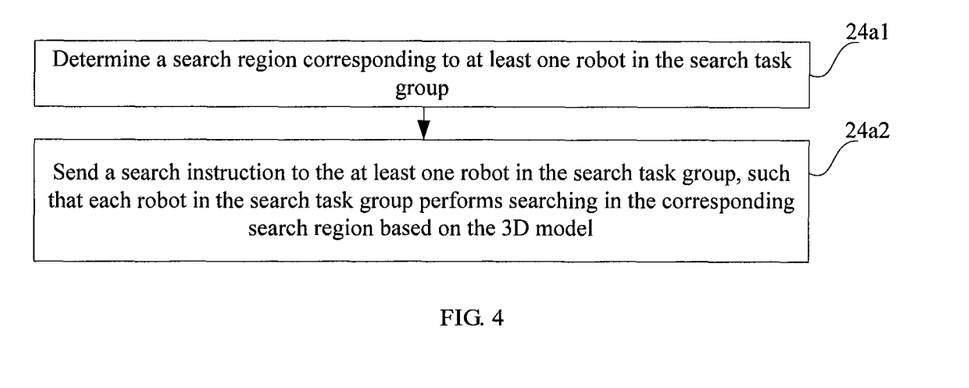
FIG. 4 is a schematic flowchart of a method for searching for the article to be searched based on an acquired 3D model in combination with a search task group in an article searching method according to an embodiment of the present application.

Specifically, as illustrated in FIG. 4, the searching for the article to be searched based on the acquired 3D model and in combination with the search task group includes the following sub-steps:

Sub-step 24*a*1: A search region corresponding to at least one robot in the search task group is determined.

Step-step 24*a*2: A search instruction is sent to the at least one robot in the search task group, such that each robot in the search task group performs searching in the corresponding search region based on the 3D model.

It may be understood that the search task group includes a plurality of robots. If the robots are reasonably allocated, the search efficiency may be effectively improved. Therefore, herein, a corresponding search region is designated to each robot in the search task group, such that the robot searches for the article in the corresponding search region based on the 3D model.

The search region of each robot may be determined based on a current position of the robot. For example, assuming that the cleaning robot is in the living room and the article reorganizing robot is in the bedroom when receiving the search task, then it is determined that the search region of the cleaning robot is the living room, and the search region of the article reorganizing robot is the bedroom. The search region of the robot in the search task group may also be determined based on the number of robots in the search task group and the size of the search region. In addition, the search region of the robot may also be determined based on a functional attribute of each robot. For example, the search region corresponding to a kitchen robot is the kitchen, and the search region corresponding to a door opening robot is the living room. Further, the search region of the robot in the search task group may also be determined in other ways.

Figure 5:
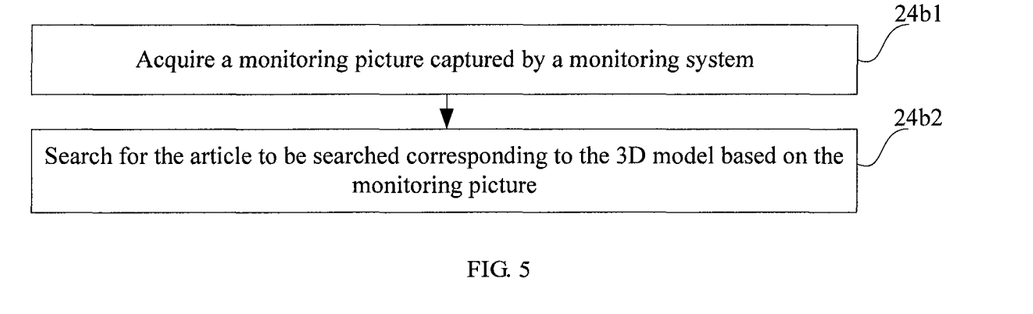
FIG. 5 is another schematic flowchart of a method for searching for the article to be searched based on an acquired 3D model in combination with a search task group in an article searching method according to an embodiment of the present application.

When a monitoring system is deployed in the search region, the search task group may perform the search under assistance of the monitoring system. Specifically, as illustrated in FIG. 5, the searching for the article to be searched based on the acquired 3D model and in combination with the search task group includes the following sub-steps:

Sub-step 24*b*1: A monitoring picture captured by a monitoring system is acquired.

Sub-step 24*b*2: The article to be searched corresponding to the 3D model is searched for based on the monitoring picture.

The monitoring picture refers to a picture captured by monitoring the search region. The monitoring picture may be acquired from the monitoring system by a robot having the most powerful operation capability in the search task group, or by a robot having no operation capability, or by a robot having completed the search task in the search region thereof. The robot shares the acquired monitoring picture to the other robots in the search task group, such that each robot may search for the article to be searched based on the 3D model and the monitoring picture. Alternatively, each robot in the search task group may acquire the monitoring picture from the monitoring system.

It may be understood that the articles to be searched by the user are generally some easily-forgotten articles, for example, glasses, earphones or the like. The user may habitually place these articles at some common positions. Therefore, the articles may be searched in combination with some history positions where the articles are placed.

Figure 6:
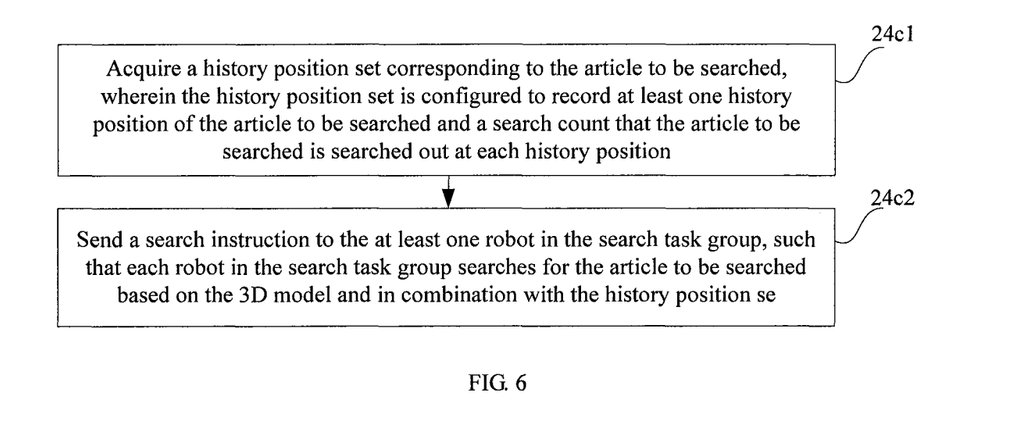
FIG. 6 is still another schematic flowchart of a method for searching for the article to be searched based on an acquired 3D model in combination with a search task group in an article searching method according to an embodiment of the present application.

Specifically, as illustrated in FIG. 6, the searching for the article to be searched based on the acquired 3D model and in combination with the search task group includes:

Sub-step 24*c*1: A history position set corresponding to the article to be searched is acquired, wherein the history position set is configured to record at least one history position of the article to be searched and a search count that the article to be searched is searched out at each history position.

Sub-step 24*c*2: A search instruction is sent to the at least one robot in the search task group, such that each robot in the search task group searches for the article to be searched based on the 3D model and in combination with the history position set.

The history position set may be pre-established, and records the positions where the articles are successfully found, and the count of times where the articles are found at these positions. History time corresponding to the history position set may be defined by the user. The history position set may be stored on each robot, or may be stored on the cloud server, or may be stored on a local server.

The searching the article based on the history position includes: ranking the history positions based on the count of times that the article to be searched is searched out at the history positions, and then searching the article based on the ranking. For example, if the count of times that the glasses are found at the computer desk is 5, the count of times that the glasses are found at the nightstand is 3 and the count of times that the glasses are found at the washing station is 2, the robot may search for the glasses based on a sequence of the computer desk, the nightstand and the washing station.

It should be noted that the above three implementation manners may be reasonably combined, such that the search task group may quickly and accurately finds the article to be searched. The combinations of these three implementation manners are described by examples.

For example, the search region corresponding to each robot in the search task group may be firstly determined, and then when the robot searches for the article to be searched in the corresponding search region, the search is carried out based on the history position set corresponding to the article to be searched in the region. For example, a robot A and a robot B collaboratively search for the book "The Making of a Hero", the search region corresponding to the robot A is the living room, and the search region corresponding to the robot B is the bedroom. The history position set of the book in the living room is [(table, 3 times), (sofa, 2 times), (drawer, 1 time)], and the history position set of the book in the bedroom is [(nightstand, 3 times), (under the pillow, 1 time)]. Herein, the robot A searches for the book "The Making of a Hero" in the living room based on a sequence of the table, the sofa and the drawer, and the robot B searches for the book "The Making of a Hero" in the bedroom based on a sequence of the nightstand and under the pillow. In this process, the robot A and the robot B may share their search results.

For example, after the search region corresponding to each robot in the search task group is determined, the robot acquires a monitoring picture in the corresponding search region, and searches for the article to be searched by scanning the monitoring picture and by searching by the robot.

For example, upon acquiring the history position set of the article to be searched, the robot calls the monitoring picture at each history position in the history position set, and thus judge whether the article to be searched exists based on the monitoring picture.

It should be noted that when the robot searches for the article to be searched in one or more of the above fashions, the position where the search is carried out and the position scanned by the monitoring system may be both marked in an indoor three-dimensional map, and the marked indoor three-dimensional map may be shared between the robots. The robot may selectively screens the search regions based on recordings of the indoor three-dimensional map.

Figure 7:
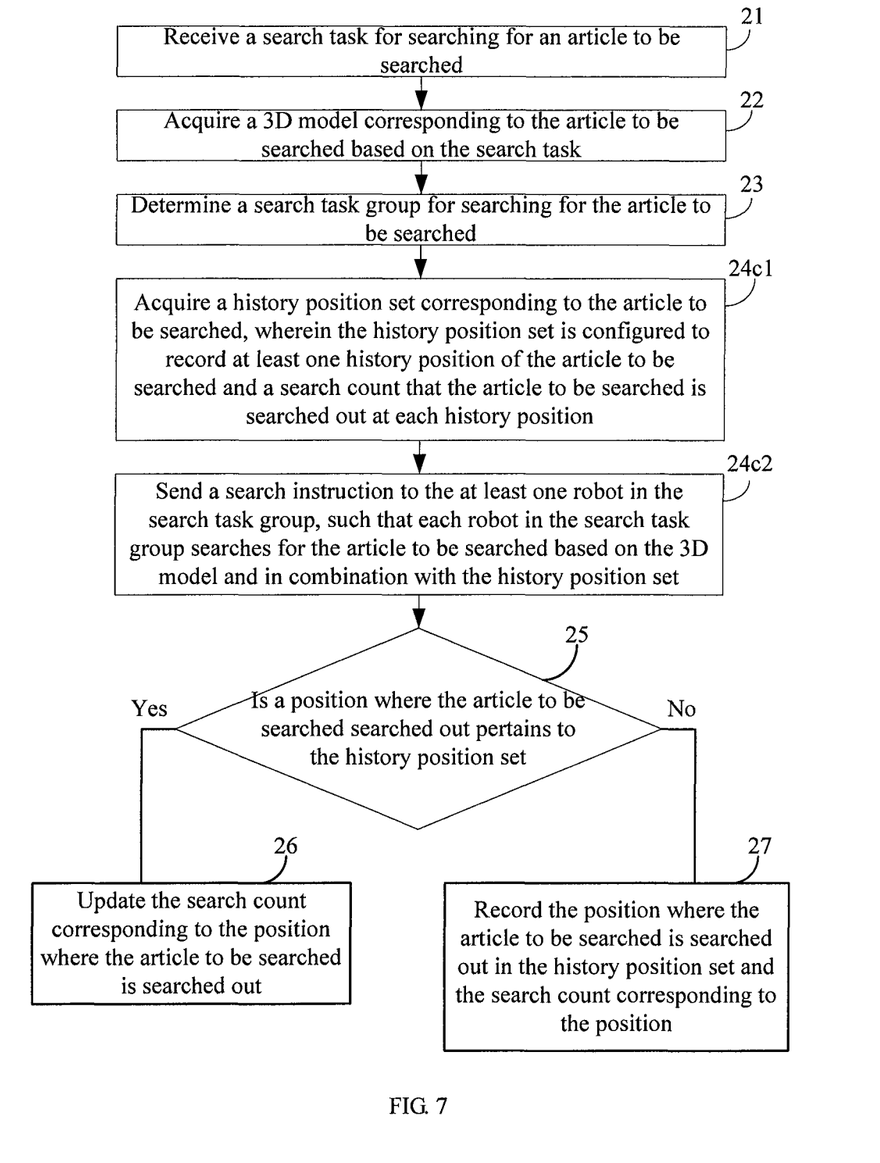
FIG. 7 is a schematic flowchart of an article searching method according to another embodiment of the present application.

Further, based on sub-steps 24*c*1 and 24*c*2, after the article to be searched is searched out, as illustrated in FIG. 7, the method further includes the following steps:

Step 25: Whether a position where the article to be searched is searched out pertains to the history position set is judged.

Step 26: The search count corresponding to the position where the article to be searched is searched out is updated if the position pertains to the history position set.

Step 27: The position where the article to be searched is searched out in the history position set and the search count corresponding to the position are recorded if the position does not pertain to the history position set.

For example, if the glasses to be searched are found at the washing station, it indicates that the position where the glasses are found pertains to the history position set, and in this case, the search count corresponding to the washing station is updated, for example, increasing the search count by 1. For example, if the glasses to be searched are found at the table, it indicates that the position where the glasses are found does not pertain to the history position set, and in this case, the position "table" is recorded to the history position set, and the corresponding search count is recorded, for example, recording the search count as 1.

An embodiment of the present application provides an article searching method. In the method, an article to be searched is searched for based on a search task group and a 3D model corresponding to the article to be searched. In the search process, the article is searched for by region division, monitoring system calling in combination with history positions. This embodiment not only improves search efficiency, but also enhances accuracy of finding the article.

Figure 8:
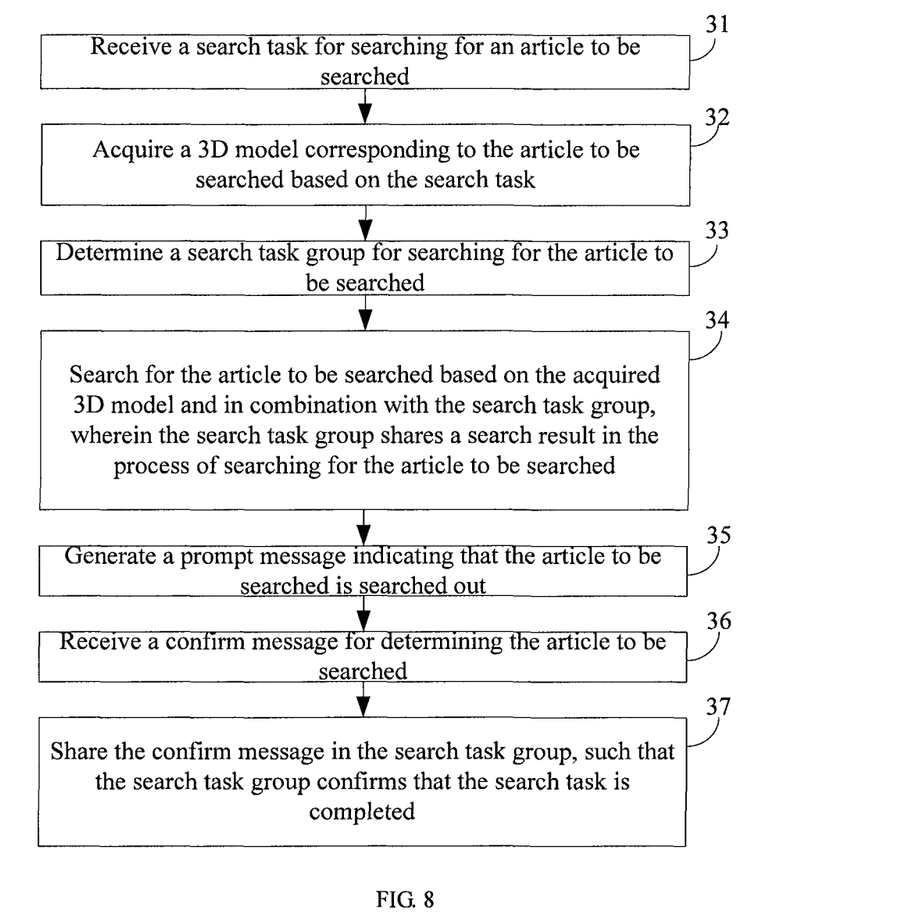
FIG. 8 is a schematic flowchart of an article searching method according to still another embodiment of the present application.

Referring to FIG. 8, FIG. 8 is a schematic flowchart of an article searching method according to still another embodiment of the present application. As illustrated in FIG. 8, the method includes the following steps:

Step 31: A search task for searching for an article to be searched is received.

Step 32: A 3D model corresponding to the article to be searched is acquired based on the search task.

Step 33: A search task group for searching for the article to be searched is determined.

Step 34: The article to be searched is searched for based on the acquired 3D model and in combination with the search task group, wherein the search task group shares a search result in the process of searching for the article to be searched.

Steps 31 to 34 may be referenced to the description in the above embodiment, which are not detailed herein any further.

Step 35: A prompt message indicating that the article to be searched is searched out is generated.

Step 36: A confirm message for determining the article to be searched is received.

Step 37: The confirm message is shared in the search task group, such that the search task group confirms that the search task is completed.

In this embodiment, when the article to be searched is finally searched out, the smart terminal may prompt the user that the article is found by generating a prompt message indicating that the article to be searched is searched out. The prompt message includes: a specific position of the article, a picture of the article and the article itself. Upon receiving the prompt message, the user makes a confirmation. If the user confirms that the found article is the article desired by the user, the confirm message is shared in the search task group, and in this case, the search task is completed and the search task group may be canceled. If the user confirms that the found article is not the article desired by the user, the user may input more characteristics of the article to be searched to the smart terminal, and the search is further exhibited in the search task group. If the article is not found upon completion of the spatial search, the user is notified that the article is not found, and the search task group is canceled.

An embodiment of the present application provides an article searching method. In the method, an article to be searched is searched for based on a search task group and a 3D model corresponding to the article to be searched, a search result is fed back to a user, and whether a search task is terminated is determined based on a confirm result from the user. In this embodiment, efficiency of searching for an article is improved, and a finally found article more accommodates user's demands.

Figure 9:
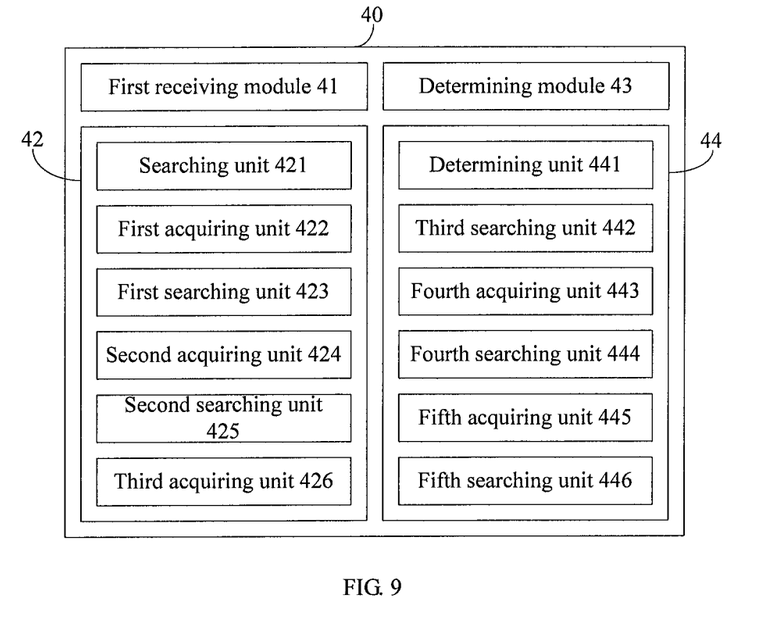
FIG. 9 is a schematic structural diagram of an article searching apparatus according to an embodiment of the present application.

Referring to FIG. 9, FIG. 9 is a schematic structural diagram of an article searching apparatus 40 according to an embodiment of the present application. As illustrated in FIG. 9, the apparatus 40 includes: a first receiving module 41, an acquiring module 42, a determining module 43 and a searching module 44.

The first receiving module 41 is configured to receive a search task for searching for an article to be searched; the acquiring module 42 is configured to acquire, based on the search task, a 3D model corresponding to the article to be searched; the determining module 43 is configured to determine a search task group for searching for the article to be searched; and the searching module 44 is configured to search for the article to be searched based on the determined 3D model and in combination with the search task group, wherein the search task group shares a search result in the process of searching for the article to be searched.

In this embodiment, the first receiving module 41 sends the received search task for searching the article to be searched to the acquiring module 42; the acquiring module 42 acquires, based on the search task, the 3D model corresponding to the article to be searched; the determining module 43 determines the search task group; and the searching module 44 searches for the article to be searched based on the 3D model acquired by the acquiring module 42 and the search task group determined by the determining module 43.

The acquiring module 42 includes: a finding unit 421, a first acquiring unit 422. a first searching unit 423, a second acquiring unit 424, a second searching unit 425 and a third acquiring unit 426. The finding unit 421 is configured to find the 3D model corresponding to the article to be searched in a local 3D model set; and the first acquiring unit 422 is configured to use the found 3D model as the 3D model corresponding to the article to be searched if the 3D model corresponding to the article to be searched is found in the local 3D model set. The first searching unit 423 is configured to search for the 3D model corresponding to the article to be searched in a network if the 3D model corresponding to the article to be searched is not found in the local 3D model set; the second acquiring unit 424 is configured to use the searched 3D model as the 3D model corresponding to the article to be searched and store the searched 3D model to the local 3D model set if the 3D model corresponding to the article to be searched is searched out in the network; the second searching unit 425 is configured to search for a picture corresponding to the article to be searched in the network if the 3D model corresponding to the article to be searched is not searched out in the network; and the third acquiring unit 426 is configured to acquire a 3D model corresponding to the article to be searched established based on the picture at a cloud end, and store the established 3D model to the local 3D model set.

The determining module 43 is specifically configured to determine the search task group for searching for the article to be searched based on a priority of the search task and priorities of tasks currently performed by other robots.

The searching module 44 includes: a determining unit 441, a third searching unit 442, a fourth acquiring unit 443, a fourth searching unit 444, a fifth acquiring unit 445 and a fifth searching unit 446. The determining unit 441 is configured to determine a search region corresponding to at least one robot in the search task group; and the third searching unit 442 is configured to send a search instruction to the at least one robot in the search task group, such that each robot in the search task group performs searching in the corresponding search region based on the 3D model. The fourth acquiring unit 443 is configured to acquire a monitoring picture captured by a monitoring system; and the fourth searching unit 444 is configured to search for the article to be searched corresponding to the 3D model based on the monitoring picture. The fifth acquiring unit 445 is configured to acquire a history position set corresponding to the article to be searched, wherein the history position set is configured to record at least one history position of the article to be searched and a search count that the article to be searched is searched out at each history position; and the fifth searching unit 446 is configured to send a search instruction to the at least one robot in the search task group, such that each robot in the search task group searches for the article to be searched based on the 3D model and in combination with the history position set.

Figure 10:
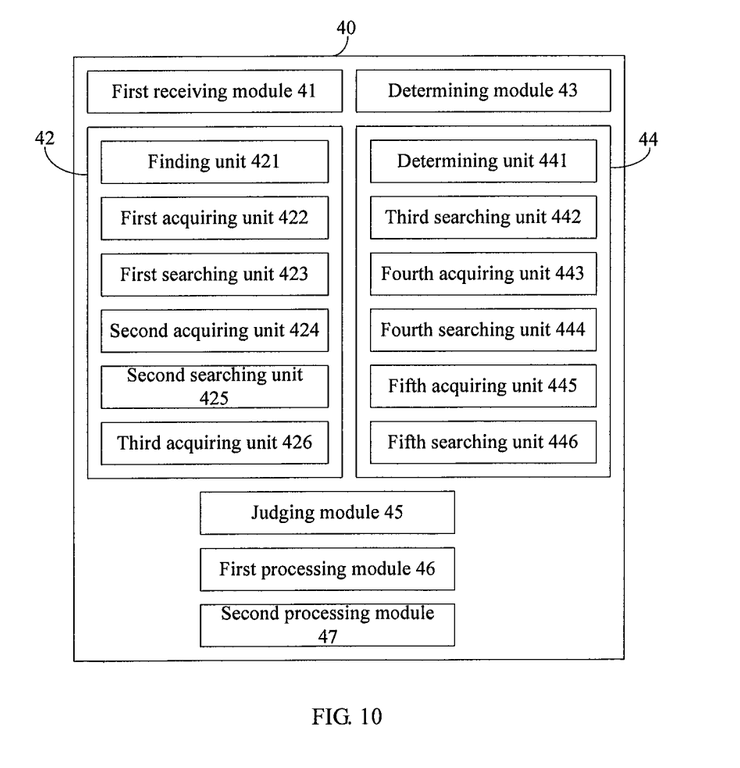
FIG. 10 is a schematic structural diagram of an article searching apparatus according to another embodiment of the present application.

In some embodiments, referring to FIG. 10, when the search result includes information indicating that the article to be searched is searched out, the apparatus further includes: a judging module 45, a first processing module 46 and a second processing module 47. The judging module 45 is configured to judge whether a position where the article to be searched is searched out pertains to the history position set; the first processing module 46 is configured to update the search count corresponding to the position where the article to be searched is searched out if the position pertains to the history position set; and the second processing module 47 is configured to record the position where the article to be searched is searched out in the history position set and the search count corresponding to the position if the position does not pertain to the history position set.

It should be noted that: since the contents such as information interaction between modules and units in the apparatus and execution processes are based on the same inventive concept as method embodiments of the present application, the specific content may refer to the description of the method embodiments of the present application, which is not defined herein any further. In addition, the article searching apparatus may be a robot, wherein the robot may be a member of the search task group, or may be a robot independent of the members of the search task group. Alternatively, the article searching apparatus may be a control mechanism.

An embodiment of the present application provides an article searching apparatus. The apparatus searches for an article to be searched based on a search task group and a 3D model corresponding to the article to be searched. In the search process, the article is searched for by region division, monitoring system calling in combination with history positions. This embodiment not only improves search efficiency, but also enhances accuracy of finding the article.

Figure 11:
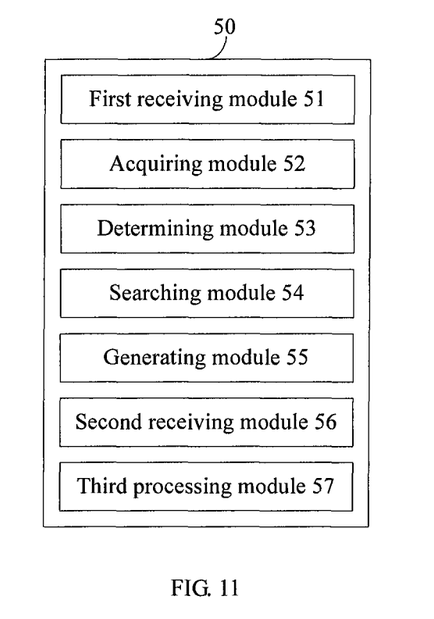
FIG. 11 is a schematic structural diagram of an article searching apparatus according to still another embodiment of the present application.

Referring to FIG. 11, FIG. 11 is a schematic structural diagram of an article searching apparatus 50 according to another embodiment of the present application. As illustrated in FIG. 11, the apparatus 50 includes: a first receiving module 51, an acquiring module 52, a determining module 53, a searching module 54, a second receiving module 56 and a third processing module 57.

The first receiving module 51 is configured to receive a search task for searching for an article to be searched; the acquiring module 52 is configured to acquire, based on the search task, a 3D model corresponding to the article to be searched; the determining module 53 is configured to determine a search task group for searching for the article to be searched; the searching module 54 is configured to search for the article to be searched based on the determined 3D model and in combination with the search task group, wherein the search task group shares a search result in the process of searching for the article to be searched; the generating module 55 is configured to generate a prompt message indicating that the article to be searched is searched out; the second receiving module 56 is configured to receive a confirm message for determining the article to be searched; and the third processing module 57 is configured to share the confirm message in the search task group, such that the search task group confirms that the search task is completed.

In this embodiment, the first receiving module 51 sends the received search task for searching the article to be searched to the acquiring module 52; the acquiring module 52 acquires, based on the search task, the 3D model corresponding to the article to be searched; the determining module 53 determines the search task group; and the searching module 54 searches for the article to be searched based on the 3D model acquired by the acquiring module 52 and the search task group determined by the determining module 53. When the search result includes information indicating that the article to be searched is searched out, the generating module 56 generates the prompt message indicating that the article to be searched is searched out, and presents the prompt message to a user; the second receiving module 56 receives the confirm message from the user, wherein the confirm message is sent to the third processing module 57; and the third processing module 57 processes the confirm message to judge whether the search task is completed.

It should be noted that: since the contents such as information interaction between modules in the apparatus and execution processes are based on the same inventive concept as method embodiments of the present application, the specific content may refer to the description of the method embodiments of the present application, which is not defined herein any further.

An embodiment of the present application provides an article searching apparatus. The apparatus searches for an article to be searched based on a search task group and a 3D model corresponding to the article to be searched, feeds back a search result to a user, and determines whether a search task is terminated based on a confirm result from the user. In this embodiment, efficiency of searching for an article is improved, and a finally found article more accommodates user's demands.

Figure 12:
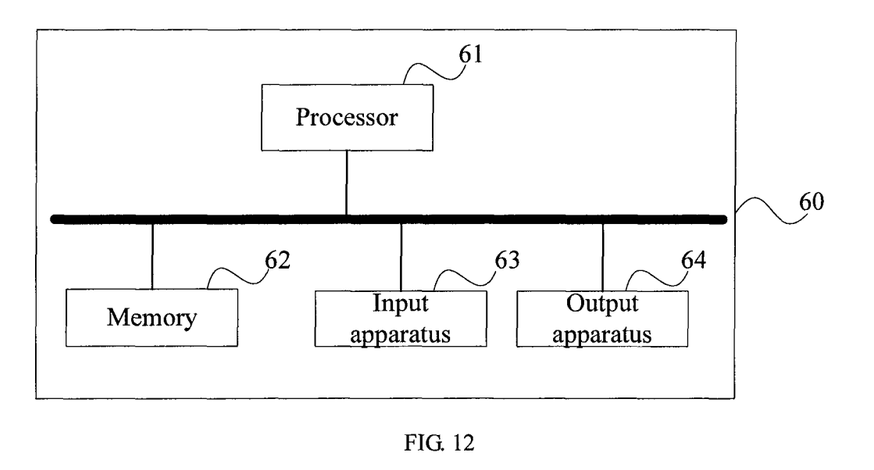
FIG. 12 is a schematic structural diagram of a robot according to an embodiment of the present application.

Referring to FIG. 12, FIG. 12 is a schematic structural diagram of a robot 60 according to an embodiment of the present application. As illustrated in FIG. 12, the robot is capable of performing the above article searching method. The robot includes a house keeping robot, a cleaning robot, an article reorganizing robot, a nursing robot and the like.

In this embodiment, the robot 60 includes at least one processor 61 and a memory 62. FIG. 12 uses one processor 61 as an example.

The at least one processor 61 and the memory 62 may be connected via a bus or in another manner, and FIG. 12 uses the bus as an example.

The robot performing the article searching method may further include: an input apparatus 63 and an output apparatus 64.

The memory 62, as a non-transitory computer-readable storage medium, may be configured to store non-transitory software programs, non-transitory computer-executable programs and modules, for example, the program instructions/modules corresponding to the article searching method in the embodiments of the present application (for example, the first receiving module 41, the acquiring module 42, the determining module 43 and the searching module 44 as illustrated in FIG. 9). The non-transitory software programs, instructions and modules stored in the memory 62, when being executed, cause the processor 61 to perform various function applications and data processing of a server, that is, performing the article searching method in the above method embodiments.

The memory 62 may include a program memory area and data memory area, wherein the program memory area may store operation systems and application programs needed by at least function; and the data memory area may store data created according to the usage of the article searching apparatus. In addition, the memory 62 may include a high speed random access memory, or include a non-transitory memory, for example, at least one disk storage device, a flash memory device, or another non-transitory solid storage device. In some embodiments, the memory 62 optionally includes memories remotely configured relative to the processor 61. These memories may be connected to the article searching apparatus over a network. Examples of the above network include, but not limited to, the Internet, Intranet, local area network, mobile communication network and a combination thereof.

The input apparatus 63 may receive input digital or character information, and generate signal input related to user settings and function control of the article searching apparatus. The output apparatus 64 may include a display device, such as, a display screen or the like.

One or more modules are stored in the memory 62, and when being executed by the at least one processor 61, perform the article searching method according to any of the above method embodiments, for example, performing steps 21 to 24 in the method as illustrated in FIG. 2, sub-steps 221 to 226 in the method as illustrated in FIG. 3, sub-steps 24a1 to 24a2 in the method as illustrated in FIG. 4, sub-steps 24b1 to 24b2 in the method as illustrated in FIG. 5, sub-steps 24c1 to 24c2 in the method as illustrated in FIG. 6, steps 21 to 27 in the method as illustrated in FIG. 7, and steps 21 to 37 in the method as illustrated in FIG. 8; and implementing the functions of modules 41 to 44, units 421 to 426 and units 441 to 446 as illustrated in FIG. 9, modules 41 to 47, units 421 to 426 and units 441 to 446 as illustrated in FIG. 10, and modules 51 to 57 as illustrated in FIG. 11. The product may perform the method according to the embodiments of the present application, has corresponding function modules for performing the method, and achieves the corresponding beneficial effects. For technical details that are not illustrated in detail in this embodiment, reference may be made to the description of the methods according to the embodiments of the present application.

An embodiment of the present application provides a non-transitory computer-readable storage medium. The non-transitory computer-readable storage medium stores computer-executable instructions, which, when being executed by an electronic device, may cause the electronic device to perform the article searching method according to any of the above method embodiments, for example, performing steps 21 to 24 in the method as illustrated in FIG. 2, sub-steps 221 to 226 in the method as illustrated in FIG. 3, sub-steps 24a1 to 24a2 in the method as illustrated in FIG. 4, sub-steps 24b1 to 24b2 in the method as illustrated in FIG. 5, sub-steps 24c1 to 24c2 in the method as illustrated in FIG. 6, steps 21 to 27 in the method as illustrated in FIG. 7, and steps 21 to 37 in the method as illustrated in FIG. 8; and implementing the functions of modules 41 to 44, units 421 to 426 and units 441 to 446 as illustrated in FIG. 9, modules 41 to 47, units 421 to 426 and units 441 to 446 as illustrated in FIG. 10, and modules 51 to 57 as illustrated in FIG. 11.

An embodiment of the present application provides a computer program product including a computer program stored in a non-transitory computer-readable storage medium. The computer program includes program instructions, which, when being executed by a computer, may cause the computer to perform the article searching method according to any of the above method embodiments, for example, performing steps 21 to 24 in the method as illustrated in FIG. 2, sub-steps 221 to 226 in the method as illustrated in FIG. 3, sub-steps 24a1 to 24a2 in the method as illustrated in FIG. 4, sub-steps 24b1 to 24b2 in the method as illustrated in FIG. 5, sub-steps 24c1 to 24c2 in the method as illustrated in FIG. 6, steps 21 to 27 in the method as illustrated in FIG. 7, and steps 21 to 37 in the method as illustrated in FIG. 8; and implementing the functions of modules 41 to 44, units 421 to 426 and units 441 to 446 as illustrated in FIG. 9, modules 41 to 47, units 421 to 426 and units 441 to 446 as illustrated in FIG. 10, and modules 51 to 57 as illustrated in FIG. 11.

The above described apparatus embodiments are merely for illustration purpose only. The units which are described as separate components may be physically separated or may be not physically separated, and the components which are illustrated as units may be or may not be physical units, that is, the components may be located in the same position or may be distributed into a plurality of network units. A part or all of the modules may be selected according to the actual needs to achieve the objectives of the technical solutions of the embodiments.

According to the above embodiments of the present application, a person skilled in the art may clearly understand that the embodiments of the present application may be implemented by means of hardware or by means of software plus a necessary general hardware platform. Persons of ordinary skill in the art may understand that all or part of the steps of the methods in the embodiments may be implemented by a program instructing relevant hardware. The program may be stored in a computer-readable storage medium and may be executed by at least one processor. When the program runs, the steps of the methods in the embodiments are performed. The storage medium may be any medium capable of storing program codes, such as read-only memory (ROM), a random access memory (RAM), a magnetic disk, or a compact disc-read only memory (CD-ROM).

Finally, it should be noted that the above embodiments are merely used to illustrate the technical solutions of the present application rather than limiting the technical solutions of the present application. Under the concept of the present application, the technical features of the above embodiments or other different embodiments may be combined, the steps therein may be performed in any sequence, and various variations may be derived in different aspects of the present application, which are not detailed herein for brevity of description. Although the present application is described in detail with reference to the above embodiments, persons of ordinary skill in the art should understand that they may still make modifications to the technical solutions described in the above embodiments, or make equivalent replacements to some of the technical features; however, such modifications or replacements do not cause the essence of the corresponding technical solutions to depart from the spirit and scope of the technical solutions of the embodiments of the present application.

What is claimed is:

1. An article searching method, comprising:
   at a robot;
   receiving a search task for searching for an article to be searched; wherein the search task is issued by voice input, text input or gesture input of user;
   acquiring, based on the search task, a three-dimensional model corresponding to the article to be searched;
   determining a search task group for searching for the article to be searched;
   wherein the search task group is a robot set comprises at least two robots;
   wherein the determining a search task group for searching for the article to be searched comprises:
   notifying at least two selected robots; and establishing the search task group base on the two selected robots; and
   searching for the article to be searched based on the acquired three-dimensional model and in combination with the search task group, wherein the robots of search task group shares a search result in the process of searching for the article to be searched;
   wherein, each robot of search task group shares a search result in the process of searching for the article to be searched comprises:
   marking the position in a three dimensions map where search is carried out, and sharing marked three-dimensional map between the robots;
   wherein the determining a search task group for searching for the article to be searched comprises:
   determining the search task group for searching for the article to be searched based on a priority of the search task and priorities of tasks currently performed by other robots;
   wherein the determining the search task group for searching for the article to be searched based on a priority of the search task and priorities of tasks currently performed by other robots comprises:
   comparing a priority of the search task issued by the user with currently performed tasks by local robots;
   when the priorities of currently performed tasks by the local robots are lower than the priority of the search task issued by the user, the robots corresponding to the low priorities are placed into the search task group, the robots preferentially perform the search task issued by the user, and the currently performed tasks are cached.

2. The method according to claim 1, wherein the acquiring a three-dimensional model corresponding to the article to be searched comprises:
   finding the three-dimensional model corresponding to the article to be searched in a local three-dimensional model set; and
   using the found three-dimensional model as the three-dimensional model corresponding to the article to be searched when the three-dimensional model corresponding to the article to be searched is found in the local three-dimensional model set.

3. The method according to claim 2, further comprising:
   searching for the three-dimensional model corresponding to the article to be searched in a network when the three-dimensional model corresponding to the article to be searched is not found in the local three-dimensional model set;
   taking the searched three-dimensional model as the three-dimensional model corresponding to the article to be searched and storing the searched three-dimensional model to the local three-dimensional model set when the three-dimensional model corresponding to the article to be searched is searched out in the network;
   searching for a picture corresponding to the article to be searched in the network when the three-dimensional model corresponding to the article to be searched is not searched out in the network; and
   acquiring a three-dimensional model corresponding to the article to be searched established based on the picture at a cloud end, and storing the established three-dimensional model to the local three-dimensional model set.

4. The method according to claim 1, wherein the searching for the article to be searched based on the acquired three-dimensional model and in combination with the search task group comprises:
   determining a search region corresponding to at least one robot in the search task group;
   sending a search instruction to the at least one robot in the search task group, such that each robot in the search task group performs searching in the corresponding search region based on the three-dimensional model.

5. The method according to claim 1, wherein the searching for the article to be searched based on the acquired three-dimensional model and in combination with the search task group comprises:
   acquiring a monitoring picture captured by a monitoring system; and
   searching for the article to be searched corresponding to the three-dimensional model based on the monitoring picture.

6. The method according to claim 1, wherein the searching for the article to be searched based on the acquired three-dimensional model and in combination with the search task group comprises:
   acquiring a history position set corresponding to the article to be searched, wherein the history position set is configured to record at least one history position of the article to be searched and a search count that the article to be searched is searched out at each history position; and
   sending a search instruction to the at least one robot in the search task group, such that each robot in the search task group searches for the article to be searched based on the three-dimensional model and in combination with the history position set.

7. The method according to claim 6, wherein when the search result comprises information indicating that the article to be searched is searched out, the method further comprises:
   judging whether a position where the article to be searched is searched out pertains to the history position set;
   updating the search count corresponding to the position where the article to be searched is searched out when the position pertains to the history position set; and
   recording the position where the article to be searched is searched out in the history position set and the search count corresponding to the position when the position does not pertain to the history position set.

8. The method according to claim 1, wherein when the search result comprises information indicating that the article to be searched is searched out, the method further comprises:
   generating a prompt message indicating that the article to be searched is searched out;
   receiving a confirm message for determining the article to be searched; and sharing the confirm message in the search task group, such that the search task group confirms that the search task is completed.

9. A robot, comprising:
at least one processor; and
a memory communicably connected to the at least one processor; wherein the memory stores an instruction program executable by the at least one processor, wherein, the instruction program, when being executed by the at least one processor, cause the at least one processor to perform the steps of:
receiving a search task for searching for an article to be searched; wherein the search task is issued by voice input, text input or gesture input of user;
acquiring, based on the search task, a three-dimensional model corresponding to the article to be searched;
determining a search task group for searching for the article to be searched; wherein the search task group is a robot set comprises at least two robots; wherein the determining a search task group for searching for the article to be searched comprises: notifying at least two selected robots; and establishing the search task group base on the two selected robots;
searching for the article to be searched based on the acquired three-dimensional model and in combination with the search task group, wherein the robots of search task group shares a search result in the process of searching for the article to be searched;
wherein, each robot of search task group shares a search result in the process of searching for the article to be searched comprises:
marking the position in a three dimensions map where search is carried out, and sharing marked three-dimensional map between the robots;
wherein the determining a search task group for searching for the article to be searched comprises:
determining the search task group for searching for the article to be searched based on a priority of the search task and priorities of tasks currently performed by other robots;
wherein the determining the search task group for searching for the article to be searched based on a priority of the search task and priorities of tasks currently performed by other robots comprises:
comparing a priority of the search task issued by the user with currently performed local robots;
when the priorities of currently performed tasks by the local robots are lower than the priority of the search task issued by the user, the robots corresponding to the low priorities are placed into the search task group, the robots preferentially perform the search task issued by the user, and the currently performed tasks are cached.

10. The robot according to claim 9, wherein the acquiring the three-dimensional model corresponding to the article to be searched comprises:
finding the three-dimensional model corresponding to the article to be searched in a local three-dimensional model set; and
using the found three-dimensional model as the three-dimensional model corresponding to the article to be searched when the three-dimensional model corresponding to the article to be searched is found in the local three-dimensional model set.

11. The robot according to claim 10, the instruction program, when being executed by the at least one processor, cause the at least one processor to perform the steps of:

searching for the three-dimensional model corresponding to the article to be searched in a network when the three-dimensional model corresponding to the article to be searched is not found in the local three-dimensional model set when the three-dimensional model corresponding to the article to be searched is searched out in the network, using the searched three-dimensional model as the three-dimensional model corresponding to the article to be searched; storing the searched three-dimensional model to the local three-dimensional model set; searching for a picture corresponding to the article to be searched in the network if when the three-dimensional model corresponding to the article to be searched is not searched out in the network; and acquiring a three-dimensional model corresponding to the article to be searched established based on the picture at a cloud end; and storing the established three-dimensional model to the local three-dimensional model set.

12. The robot according to claim 9, wherein the searching for the article to be searched based on the acquired three-dimensional model and in combination with the search task group comprises:
determining a search region corresponding to at least one robot in the search task group;
sending a search instruction to the at least one robot in the search task group, such that each robot in the search task group performs searching in the corresponding search region based on the three-dimensional model.

13. The robot according to claim 9, wherein the searching for the article to be searched based on the acquired three-dimensional model and in combination with the search task group comprises:
acquiring a monitoring picture captured by a monitoring system; and
searching for the article to be searched corresponding to the three-dimensional model based on the monitoring picture.

14. The apparatus according to claim 9, wherein the searching for the article to be searched based on the acquired three-dimensional model and in combination with the search task group comprises:
acquiring a history position set corresponding to the article to be searched, wherein the history position set is configured to record at least one history position of the article to be searched and a search count that the article to be searched is searched out at each history position; and
sending a search instruction to the at least one robot in the search task group, such that each robot in the search task group searches for the article to be searched based on the three-dimensional model and in combination with the history position set.

15. The robot according to claim 14, wherein when the search result comprises information indicating that the article to be searched is searched out, the instruction program, when being executed by the at least one processor, cause the at least one processor to perform the steps of:
judging whether a position where the article to be searched is searched out pertains to the history position set;
updating the search count corresponding to the position where the article to be searched is searched out when the position pertains to the history position set; and
recording the position where the article to be searched is searched out in the history position set and the search count corresponding to the position when the position does not pertain to the history position set.

16. The robot according to claim 9, wherein when the search result comprises information indicating that the article to be searched is searched out, the instruction program, when being executed by the at least one processor, cause the at least one processor to perform the steps of:
generating a prompt message indicating that the article to be searched is searched out;
receiving a confirm message for determining the article to be searched; and
sharing the confirm message in the search task group, such that the search task group confirms that the search task is completed.

17. A non-transitory computer-readable storage medium, wherein the computer-readable storage medium stores computer-executable instructions, which, when being executed by a computer, cause the computer to perform the steps of:
receiving a search task for searching for an article to be searched; wherein the search task is issued by voice input, text input or gesture input of user;
acquiring, based on the search task, a three-dimensional model corresponding to the article to be searched;
determining a search task group for searching for the article to be searched;
wherein the search task group is a robot set comprises at least two robots;
wherein the determining a search task group for searching for the article to be searched comprises:
notifying at least two selected robots; and establishing the search task group base on the two selected robots; and
searching for the article to be searched based on the acquired three-dimensional model and in combination with the search task group, wherein the robots of search task group shares a search result in the process of searching for the article to be searched;
wherein, each robot of search task group shares a search result in the process of searching for the article to be searched comprises:
marking the position in a three dimensions map where search is carried out, and sharing marked three-dimensional map between the robots;
wherein the determining a search task group for searching for the article to be searched comprises:
determining the search task group for searching for the article to be searched based on a priority of the search task and priorities of tasks currently performed by other robots;
wherein the determining the search task group for searching for the article to be searched based on a priority of the search task and priorities of tasks currently performed by other robots comprises:
comparing a priority of the search task issued by the user with currently performed tasks by local robots;
when the priorities of currently performed tasks by the local robots are lower than the priority of the search task issued by the user, the robots corresponding to the low priorities are placed into the search task group, the robots preferentially perform the search task issued by the user, and the currently performed tasks are cached.

18. The non-transitory computer-readable storage medium according to claim 17, wherein the computer-executable instructions when being executed by a computer, cause the computer to perform the steps of: finding the three-dimensional model corresponding to the article to be searched in a local three-dimensional model set; and using the found three-dimensional model as the three-dimensional model corresponding to the article to be searched when the three-dimensional model corresponding to the article to be searched is found in the local three-dimensional model set.

* * * * *

UNITED STATES PATENT AND TRADEMARK OFFICE
CERTIFICATE OF CORRECTION

| | | |
|---|---|---|
| PATENT NO. | : 11,389,961 B2 | Page 1 of 1 |
| APPLICATION NO. | : 16/679692 | |
| DATED | : July 19, 2022 | |
| INVENTOR(S) | : Lei Luo | |

It is certified that error appears in the above-identified patent and that said Letters Patent is hereby corrected as shown below:

On the Title Page

Item (73) Assignee:
CLOUDMINDS (SHENZHEN) ROBOTICS SYSTEMS CO., LTD., Shenzhen (CN)
Is changed to:
CLOUDMINDS ROBOTICS CO., LTD., Shenzhen (CN)

Signed and Sealed this
Fourteenth Day of January, 2025

Derrick Brent
*Acting Director of the United States Patent and Trademark Office*